May 26, 1970  R. L. LICH  3,513,782
MOTOR TORQUE-EQUALIZED RAILWAY MOTOR TRUCK
Filed July 26, 1968

INVENTOR
RICHARD L. LICH
BY Bedell & Burgess
ATTORNEYS

United States Patent Office 3,513,782
Patented May 26, 1970

3,513,782
MOTOR TORQUE-EQUALIZED RAILWAY MOTOR TRUCK
Richard L. Lich, Town and Country, Mo., assignor to General Steel Industries, Inc., Granite City, Ill., a corporation of Delaware
Filed July 26, 1968, Ser. No. 747,910
Int. Cl. B61c 9/48, 9/50
U.S. Cl. 105—135                    9 Claims

ABSTRACT OF THE DISCLOSURE

In a railway two axle motor truck of the type in which the truck frame is spring-supported on the axles, means for eliminating spalling of the rail-engaging surfaces of the wheels resulting from the conventional support of the gear box torque arms on the truck frame whereby vertical movements of the truck frame on its supporting springs with respect to the axles produces slight reciprocation of the axles lengthwise of the truck and slight oscillation of the axles about their axes. In the present construction, instead of supporting the gear box torque arms on the truck frame, they are supported on each other, preferably at points spaced longitudinally of the truck, and their connections to each other are such that relative movement longitudinally of the truck between them is permitted to accommodate changes in the distance between axle centers resulting from different vertical movements of the axles with respect to the truck frame.

FIELD OF THE INVENTION

The invention relates to railway rolling stock and consists particularly in an improved arrangement of the torque arms of the driving gear boxes of railway electric motor trucks.

DESCRIPTION OF THE PRIOR ART

In railway electric motor trucks of the type in which longitudinal motors are rigidly suspended from the truck frame and are connected by Cardan shafts to gear boxes mounted on the respective axles, the gear boxes are provided with longitudinally extending torque arms, which are often directly connected at their extremities to the truck frame. Where the frame is spring supported on the axles so that, as it moves up and down with respect to the axles, the direct connection of the torque arm to the frame causes the axle to move a slight distance longitudinally of the truck as permitted by clearance in the pedestal jaws and also produces a slight oscillation of the axle about its axis. The resultant sliding movement of the wheels on the rails causes spalling of the treads and flanges where they engage the rails.

SUMMARY OF THE INVENTION

The invention provides means for reducing wheel spalling in electric motor trucks of the type in which the frame is spring supported on the axles by supporting the gear box torque arms from each other with provision for slight longitudinal movement therebetween.

DESCRIPTION OF THE PREFERRED EMBODIMENT

Figure 1:
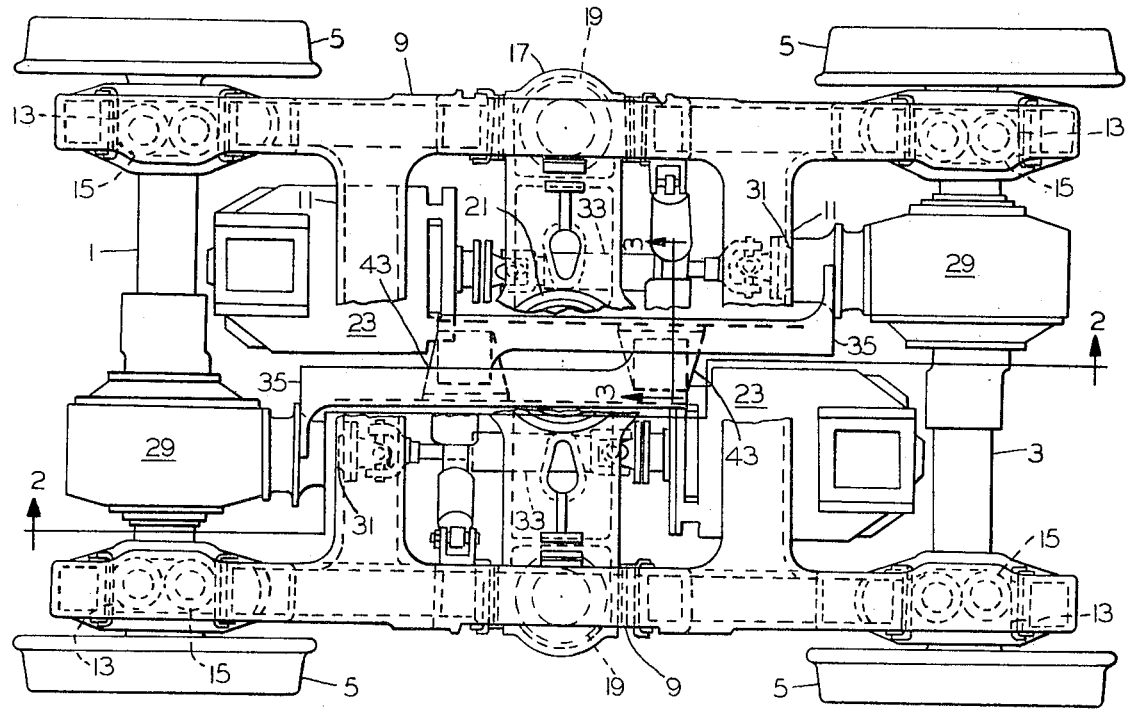
FIG. 1 is a plan view of a railway electric motor truck incorporating the invention, partially broken away to show the torque arm arrangement.
Figure 2:
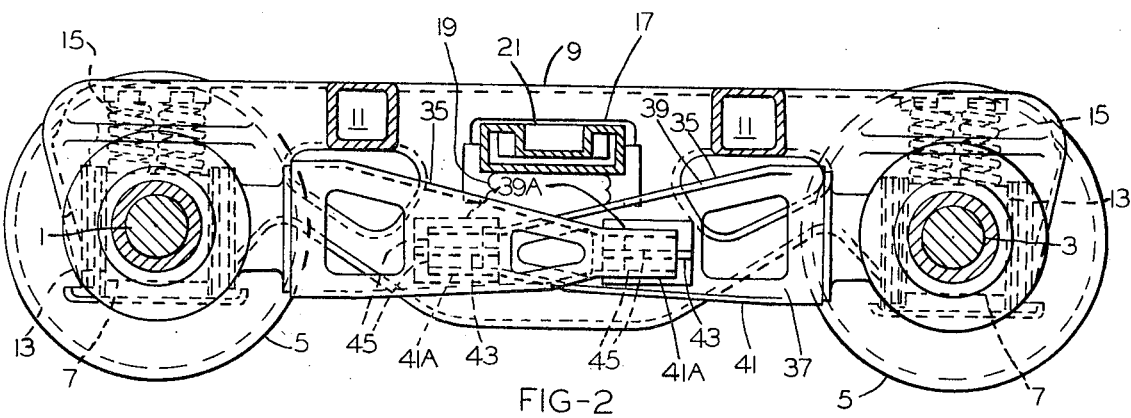
FIG. 2 is a longitudinal vertical sectional view along line 2—2 of FIG. 1.
Figure 3:
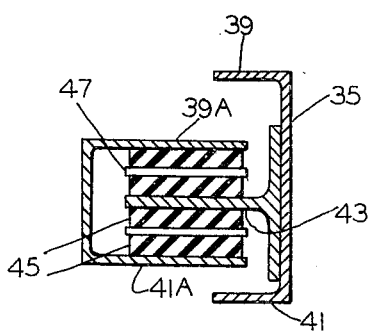
FIG. 3 is a fragmentary transverse vertical sectional view along line 3—3 of FIG. 1.

The truck comprises a pair of parallel axles 1 and 3 spaced apart lengthwise of the truck from each other and rigidly mounting at their extremities pairs of railway flanged wheels 5. Inboard of wheels 5, axles 1 and 3 are rotatably received within journal boxes 7.

A rigid truck frame comprises longitudinally extending side members 9, 9 spaced apart transversely of the truck and positioned laterally inboard of wheels 5, and spaced transversely extending transoms 11, 11 rigidly connecting side frames 9, 9. At their ends, side members 9, 9 are formed with downwardly open pedestal jaws 13 embracing, and vertically slidably receiving journal boxes 7. For preventing the transmission of longitudinal impacts received by the wheels to the truck frame, coil springs 15 seated on each journal box 7, directly support truck frame side members 9, 9 and accommodate some vertical movements thereof on the journal boxes 7, 7. A transverse body-supporting bolster 17 is supported at its ends by springs 19, 19 on frame side members 9, 9. At its center bolster 17 is formed with an upwardly facing pivot center plate 21 for pivotally supporting a car body thereon.

For driving the truck, a pair of longitudinally extending traction motors 23, 23 are suspended respectively from transoms 11, 11 intermediate the axles 1 and 3 and bolster 17, and are positioned at opposite sides of the truck frame from each other. Right angle drive gear boxes 29, 29 are mounted on axles 1 and 3 in alignment longitudinally of the truck respectively with motors 23, 23, i.e. gear boxes 29, 29 are located in diagonally opposite portions of the truck as viewed in plan. The input shaft 31 of each of each of the gear boxes 29, is connected by a Cardan shaft 33 to its respective motor.

For opposing rotation of gear boxes 29 about axles 1 and 3 induced by the application of motor torques to the gear boxes, each of the gear boxes 29 is provided with a longitudinally extending torque arm 35 extending longitudinally of the truck inwardly from gear boxes 29 under the bolster to a point on the opposite side of bolster 17 from the associated gear box 29.

To eliminate the oscillation of the axles and their reciprocation lengthwise of the truck caused by the conventional support of the gear box torque arms from the truck frame, torque arms 35, 35 are arranged for connection to each other rather than to the truck frame.

To effectuate such connection to each other, torque arms 35 are of channel section, having vertical webs 37 and spaced top and bottom flanges 39 and 41 directed transversely inwardly from the webs and tapering toward each other longitudinally of the truck from a maximum vertical spacing adjacent their associated gear boxes 29 to a minimum vertical spacing at their extremities 39A and 41A where they are parallel to each other.

From the foregoing it will be evident that torque arms 35, 35 extend parallel to each other for some distance longitudinally of the truck beneath bolster 17. At their extremities 39A and 41A torque arm flanges 39, 41 are widened and each of the torque arm webs 35 mounts, abreast of the extremity of the other torque arm, a transverse horizontal intermediate flange 43 which extends between the flange extremities 39A and 41A of the opposite torque arm. Elastomeric sandwich devices each comprising a pair of rubber pads 45 interleaved by a metal plate 47 are interposed between flanges 43 and 39A and 41A respectively, and by their resistance to compression combined with the arm, through which they operate longitudinally of the truck, oppose tendencies of the torque arms and the associated gear boxes to tip about the axles, while, through yieldability of the elastomeric pads 45 in shear longitudinally of the truck and their slight yieldability in compression accommodate such foreshortening of the distance between the axles and results from the differential vertical movements of the axle in the truck frame and also differential tilting movements of the axles transversely of the truck.

During operation of the truck, as the axles move vertically with respect to each other due to vertical irregularities in the track surface, changes in the distance between axle centers will be accommodated through yielding in sheer of pads 45, but due to the spacing, longitundinally of the truck, of pads 45 and the associate of opposing flanges 43 and 39A and 41A of torque arms 35 and the resistance of the pads 45 to compression, relative tilting of the torque arms and the associated gear boxes about the axles will be resisted.

The invention may be modified in various respects as will occur to those skilled in the art and the exclusive use of all modifications as come within the appended claims is contemplated.

I claim:

1. In a railway vehicle truck, framing including longitudinally extending side members, a pair of wheeled axles mounted in said side members and thereby spaced apart lengthwise of the truck, driving gear boxes mounted on both of said axles, each of said gear boxes having a rigid torque arm extending longitudinally of the truck toward the outer gear box, means independent of said axles and said framing connecting said torque arms to each other intermediate said axles and preventing substantial pivotal movements of said torque arms about their respective axles with respect to each other.

2. In a railway vehicle truck according to claim 1, said connecting means being yieldable longitudinally and transversely of the truck whereby to permit slight longitudinal and transverse movements and slight pivotal movements about their longitudinal axes of said torque arms with respect to each other.

3. In a railway vehicle truck according to either of claims 1 or 2, said torque arms having portions in lapped relation with each other, said connecting means being spaced apart longitudinally of said lapped portions.

4. In a railway vehicle truck according to claim 1, the lapped portions of said torque arms being in side by side relation and each being formed with transversely extending parts overlying and underlying corresponding parts on each other.

5. In a railway vehicle truck according to claim 4, flat elastomeric pads being compressed between said relatively overlying and underlying parts of said torque arms to prevent vertical disalignment between said torque arms while permitting slight relative movements longitudinally of the truck and slight pivotal movements of said torque arms with respect to each other about their longitudinal axes.

6. In a railway vehicle truck according to claim 5, said torque arms being of channel cross section with their webs vertical and their flanges extending toward each other transversely of the truck and forming pairs of said transversely extending parts adjacent the extremities of each of said torque arms, a third intermediate flange formed on each torque arm in transverse alignment with the extremity of the other torque arm and extending between said first-named channel flanges, said elastomeric pad devices being compressed in the spaces between said intermediate flanges and said channel flanges.

7. In a railway vehicle truck according to claim 5, said gear boxes being mounted on opposite end portions of said axles, said torque arms being secured to the laterally inboard sides of said gear boxes and extending longitudinally inwardly therefrom in close proximity to the longitudinal center line of the truck.

8. In a railway vehicle truck according to claim 7, said gear boxes being of the right angle drive type, longitudinally extending motors supported from said frame between the gear box and the other axle, and flexible shaft means extending longitudinally of the truck and connecting each said motor with one of said gear boxes.

9. In a railway vehicle truck according to claim 8, said framing side members being resiliently supported on said axles for vertical movement thereon, and characterized by the absence of connections of said bear box torque arms to said framing.

References Cited

UNITED STATES PATENTS

| | | | |
|---|---|---|---|
| 424,207 | 3/1890 | Hunter | 105—139 XR |
| 644,198 | 2/1900 | Du Pont | 105—135 |
| 1,822,895 | 9/1931 | Kiesel | 105—135 XR |
| 2,412,657 | 12/1946 | Stoltz | 105—133 |
| 2,811,113 | 10/1957 | Short | 105—138 XR |

ARTHUR L. LA POINT, Primary Examiner

U.S. Cl. X.R.

105—139